United States Patent [19]
Asahina

[11] Patent Number: 5,285,198
[45] Date of Patent: Feb. 8, 1994

[54] METHOD OF COMMUNICATING MONITOR/MANAGEMENT INFORMATION AND COMMUNICATION DEVICES IN NETWORK INCLUDING COMMUNICATION DEVICES CONNECTED THROUGH SWITCHED NETWORK

[75] Inventor: Takeshi Asahina, Inagi, Japan

[73] Assignee: Fujitsu Limited, Kawasaki, Japan

[21] Appl. No.: 747,703

[22] Filed: Aug. 20, 1991

[30] Foreign Application Priority Data

Aug. 20, 1990 [JP] Japan .................. 2-218531
Nov. 14, 1990 [JP] Japan .................. 2-308371

[51] Int. Cl.$^5$ .............. G05B 23/02; H04M 11/00; H04M 11/06; H04J 1/14
[52] U.S. Cl. .................. 340/825.15; 340/825.06; 340/825.16; 370/76; 370/125; 379/93; 379/97; 379/98
[58] Field of Search .......... 340/825.16, 825.15, 340/825.06; 379/2, 24, 8, 93, 107, 97, 98; 370/13, 17, 125, 16, 76

[56] References Cited

U.S. PATENT DOCUMENTS

| | | | |
|---|---|---|---|
| 4,266,097 | 5/1981 | Cannon et al. | 340/825.18 |
| 4,273,955 | 6/1981 | Armstrong. | |
| 4,993,062 | 2/1991 | Dula et al. | 379/98 |
| 5,086,453 | 2/1992 | Senoo et al. | 379/98 |

OTHER PUBLICATIONS

"Modem Systems for Corporate Information Networks", T. Anzai et al., NEC Research and Development No. 98, Jul. 1990, Tokyo, Japan, pp. 72-79.
"Problem Management and Determination in SNA Sub-Networks", R. D. Martin, Southeastcon '90, vol. 3, Apr. 1990, New Orleans, U.S., pp. 953-957.
"EDNET for the Supervision of Data Transmission Networks", B. Lengquist et al., Ericsson Review, vol. 61, No. 1, 1984, Stockholm SE, pp. 26-31.

*Primary Examiner*—John K. Peng
*Assistant Examiner*—Andrew M. Hill
*Attorney, Agent, or Firm*—Staas & Halsey

[57] ABSTRACT

A communication network includes a first communication device (10, 64), a second communication device (14, 66) connected through a switched network (12, 68) to the first communication device (10, 64), in order to carry out a communication with the first communication device (10, 64), and a monitor/management device (16, 60) for performing a monitoring and/or management of the first and the second communication devices. In a first embodiment of the present invention, a disconnection factor requiring a disconnection between the first and the second communication devices is detected in the second communication device, and is transmitted to the first communication device, and thereafter, a connection between the first and the second communication devices is disconnected. In a second embodiment of the present invention, monitor/management information from the monitor/management device to the second communication device is once retained in the first communication device and is transmitted to the second communication device while both are connected to thereby carry out a user communication. Monitor/management information from the second communication device to the monitor/management device is transmitted to the first communication device while both are connected, and once retained in the first communication device.

8 Claims, 16 Drawing Sheets

◯ : MONITOR/MANAGEMENT INFORMATION

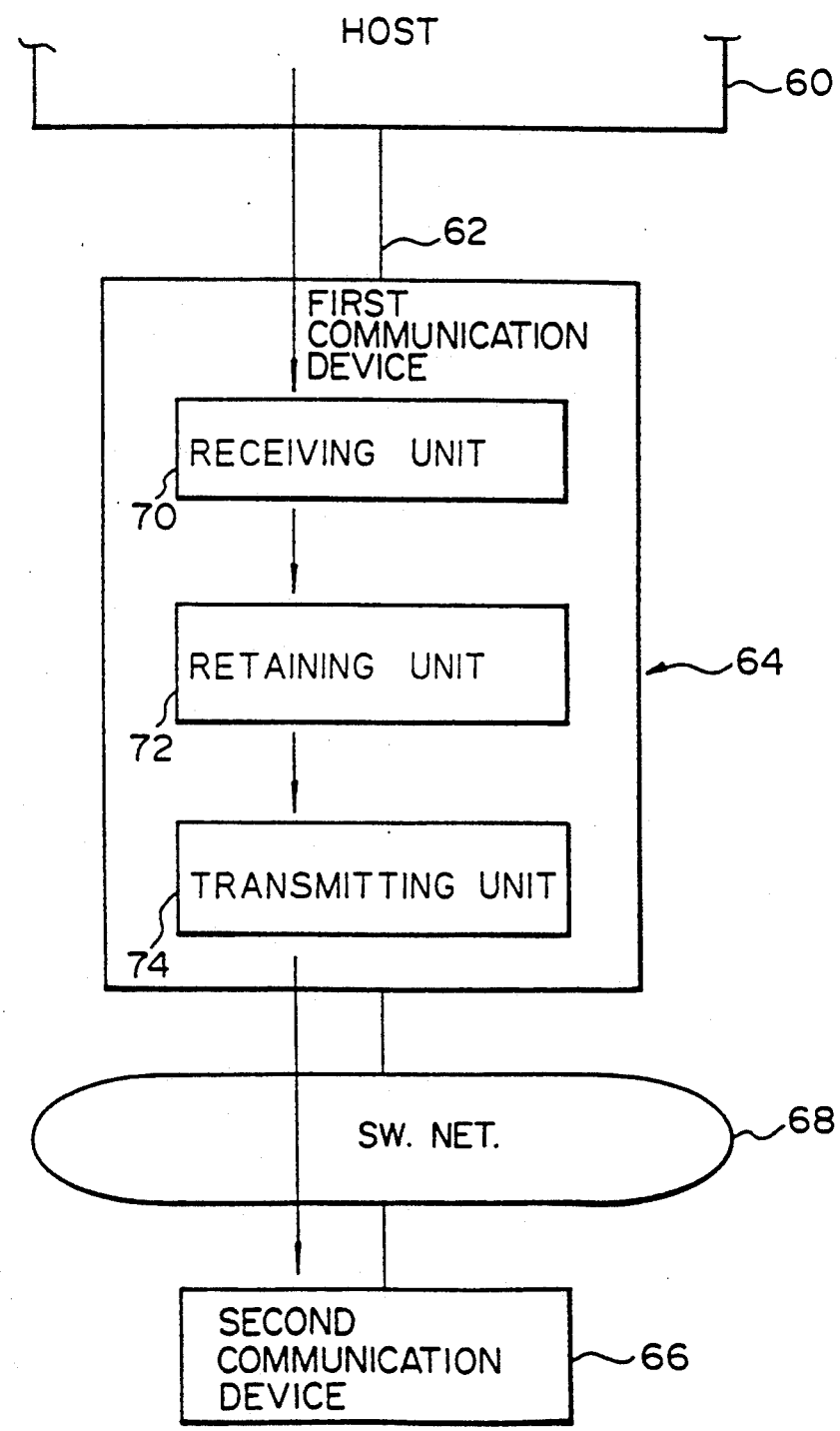

METHOD OF COMMUNICATING MONITOR/MANAGEMENT INFORMATION AND COMMUNICATION DEVICES IN NETWORK INCLUDING COMMUNICATION DEVICES CONNECTED THROUGH SWITCHED NETWORK

BACKGROUND OF THE INVENTION

1. Field of the Invention

The present invention relates to a method of transmitting monitor/management information in a data communication network constructed by connecting a plurality of communication devices, for realizing a communication between a plurality of data terminals such as personal computers. The present invention also relates to the communication device in the network. The monitor/management information includes information on the causes of disconnections of lines between the communication devices and other information, such as identification numbers of the communication devices, the type of communication devices, set conditions in the communication devices, and the data and time of events occurring in the communication devices.

2. Description of the Related Art

The aforementioned data communication network has been enlarged, given a higher performance, and has had various functions added thereto, and thus a unified monitoring and/or management of the network is now required.

Also, many different types of communication devices constitute the network. Namely, not only communication devices connected through a private line or a leased line but also communication devices connected through a public switched network or a switched network are used, and therefore, a monitoring and/or management of the communication devices connected through the switched network is required.

In a network including only communication devices connected through a private line or leased line, a unified monitoring/management of the network has been realized by communicating monitor/management data between first communication devices connected to a host for monitoring/management and second communication devices connected through that line to the first communication devices, independently of a user data communication between the communication devices, whenever the host or the communication devices requires same and as long as they are normally operating. Usually, the communication of the monitoring/management data is carried out by using a lower frequency band than that of the user data communication, within a frequency band of the communication line.

Nevertheless, in a network including the second communication devices connected through the switched network, since repeated connections and disconnections between the communication devices occur in the switched line as time elapses, the second communication device cannot communicate the monitoring/management data to the host except when the second communication device is connected through the switched network to the first communication device connected to the host. Thus, when a disconnection between the communication devices occurs, the communication device cannot communicate the cause of disconnection to the host after the disconnection, even if the device can detect same.

Generally, the cause of the disconnection is due the following factors i) to iv), and the factors i) to iii) can be detected by the communication device:

i) normal disconnection by a disconnection control signal from a data terminal connected to a communication device;

ii) manual disconnection using a switch provided in a communication device;

iii) spontaneous disconnection by a communication device when the communication device detects a deterioration of a line such that a normal data communication cannot be maintained; and iv) sudden disconnection caused by an obstruction.

In addition, as mentioned before, communication of the monitoring/management data can be carried out only during the user data communication, by utilizing a lower frequency band. The user data communication is carried out as required by the user, because the user fears the expense thereof. On the other hand, a predetermined communication time dependent or a throughput of the host and the communication device, a delay time in the transmitting line, and a transmission rate, are required for the communication of the monitoring/management data, and therefore, the communication of the monitoring/management data may be broken off before it is completed.

SUMMARY OF THE INVENTION

Therefore, an object of the present invention is to provide a method of transmitting monitor/management information in a communication network including communication devices connected through a switched network.

More particularly, an object of the present invention is to provide a method of communicating a disconnection factor in a communication network including communication devices connected through a switched network.

Another object of the present invention is to provide a method of transmitting monitor/management information from a host to a communication device and from the communication device to the host in a communication network including communication devices connected through a switched network.

Still another object of the present invention is to provide a communication device for realizing the above objects.

Thus, in accordance with the present invention, there is provided a method of communicating a disconnection factor in a communication network including a first communication device, a second communication device connected through a switched network to the first communication device, and a monitoring device connected through a line to the first communication device, comprising the steps of:

detecting the disconnection factor requiring a disconnection of a communication between the first and the second communication devices in the second communication device, delaying a disconnection in response to the disconnection factor, transmitting the detected disconnection factor from the second communication device to the first communication device, independently of a user communication between the first and the second communication devices, disconnecting a communication between the first and the second communication devices after the communication of the disconnection factor is completed, receiving the transmitted disconnection factor in the first communication device, retaining the received disconnection factor in the first communication device, and transmitting the retained disconnection factor through the line to the monitoring device in response to a requirement.

In accordance with the present invention there is also provided a communication device capable of being connected through a switched network to a second communication device and connected through a line to a monitoring device, comprising:

receiving means for receiving a disconnection factor from the second communication device through the switched network, independently of a user communication between the first and the second communication device;

retaining means for retaining the disconnection factor received in the receiving means, and transmitting means for transmitting the retained disconnection factor through the line to the monitoring device in response to a requirement.

In accordance with the present invention there is provided a communication device capable of being connected through a switched network to a first communication device connected through a line to a monitoring device comprising:

detecting means for detecting a disconnection factor requiring a disconnection of a communication between the first and the second communication devices;

transmitting means for transmitting the disconnection factor detected in the detecting means through the switched network to the first communication device, independently of a user communication between the first and the second communication devices, and delaying means for delaying a disconnection in response to the disconnection factor until the transmission of the disconnected factor by the transmitting means is completed.

In accordance with the present invention there is also provided a method of communicating monitor/management information in a communication network including a first communication device, a second communication device connected through a switched network to the first communication device, and a monitor/management device connected through a line to the first communication device, comprising the steps of:

i) transmitting first monitor/management information from the monitor/management device through the line to the first monitor/management device, ii) retaining the first monitor/management information in the first communication device, iii) transmitting second monitor/management information from the second communication device through the switched network to the first communication device while the first and the second communication devices are connected through the switched network to each other, in order to carry out a user communication between the first and the second communication devices, iv) retaining the second monitor/management information in the first communication device, and v) transmitting the first monitor/management information from the first communication device through the switched network to the second communication device while the first and the second communication devices are connected through the switched network to each other, in order to carry out a user communication between the first and the second communication devices, vi) transmitting the second monitor/management information from the first communication device to the monitor/management device in response to a requirement.

Also, in accordance with the present invention there is provided a communication device able to be connected through a switched network to a second communication device and connected through a line to a monitor/management device comprising:

first receiving means for receiving first monitor/management information from the monitor/management device, first retaining means for retaining the first monitor/management information received in the first receiving means, first transmitting means for transmitting the first monitor/management information retained in the first retaining means through the switched network to the second communication device while the first and the second communication devices are connected through the switched network to each other, in order to carry out a user communication between the first and the second communication devices, second receiving means for receiving second monitor/management information from the second communication device while the first and the second communication devices are connected through the switched network to each other, in order to carry out a user communication between the first and the second communication devices, second retaining means for retaining the second monitor/management information received in the second receiving means, and second transmitting means for transmitting the second monitor/management information to the monitor/management device in response to a requirement.

BRIEF DESCRIPTION OF THE DRAWINGS

FIGS. 6 to 9 are block diagrams showing basic concepts of constructions of the first communication device 64 according to the second embodiment of the present invention;

DESCRIPTION OF THE PREFERRED EMBODIMENTS

Communication of Disconnection Factor

Figure 1:
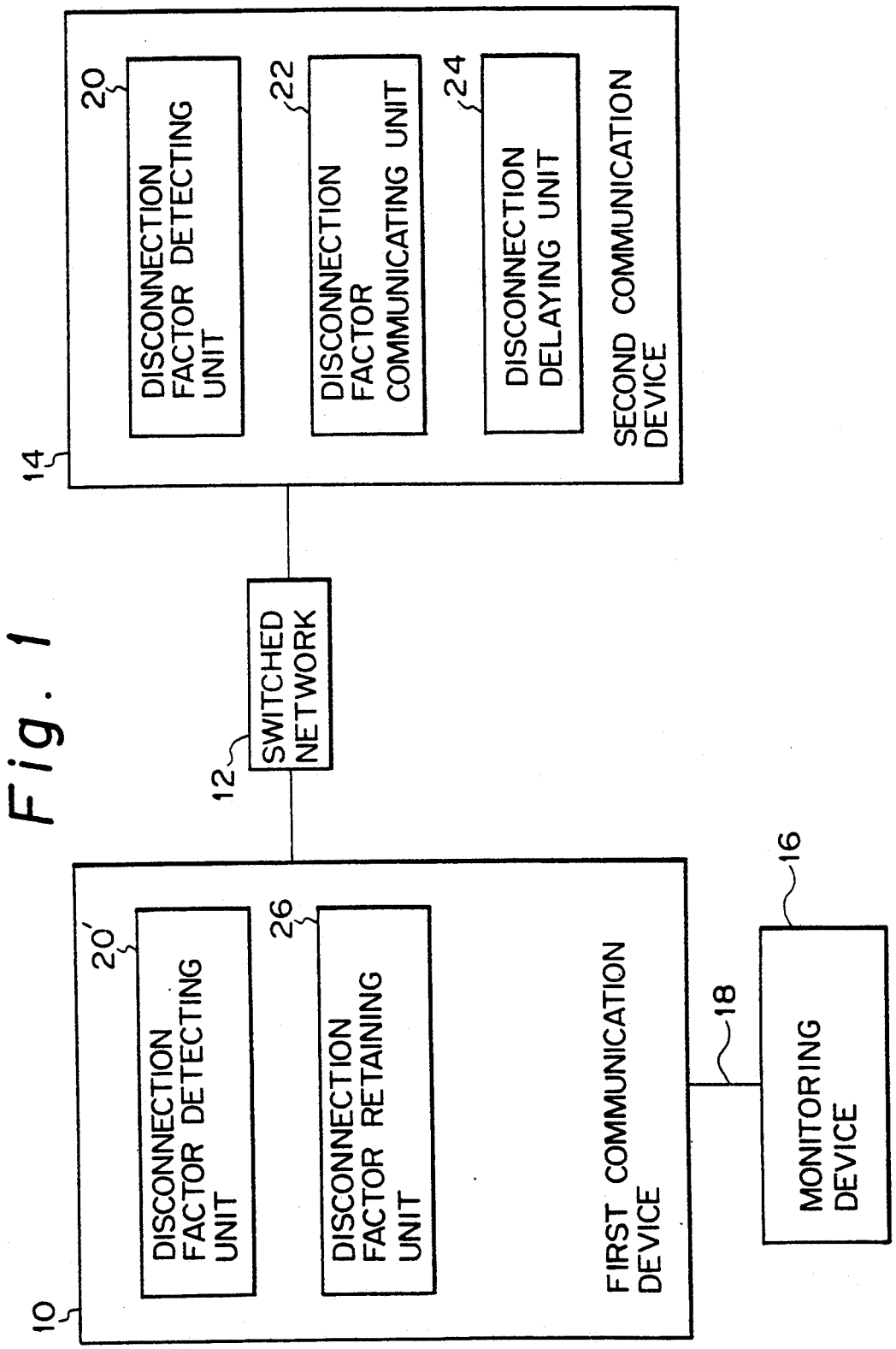
FIG. 1 is a block diagram showing a basic concept of a communication of a disconnection factor in a communication network according to a first embodiment of the present invention.

FIG. 1 is a block diagram showing a basic concept of communication of a disconnection factor in a communication network according to a first embodiment of the present invention. In FIG. 1, a first communication device 10 is connected through a switched network to a second communication device 16, 14, and a monitoring device is connected through a private or leased line 18 to the first communication device 10.

The second communication device 14 comprises a disconnection factor detecting unit 20 for detecting a disconnection factor when a disconnection is required in the second communication device 14, a disconnection factor communicating unit 22 for communicating the disconnection factor detected in the disconnection factor detecting unit 20 to the first communication device 10, and a disconnection delaying unit 24 for delaying the disconnection until the communication of the disconnection factor communicating unit 22 is completed. The first communicating device comprises a disconnection factor detecting unit 20' for detecting a disconnection factor when a disconnection is required in the first communication device 10, and a disconnection factor retaining unit 26 for retaining the disconnection factor detected in the disconnection factor detecting unit 20' and the disconnection factor communicated from the second communication device 14 until these factors are required to be read out from the monitoring device 16.

When a disconnection is required in the second communication device 14, the disconnection factor detecting unit 20 detects the detection factor and the disconnection factor communicating unit 22 communicates the disconnection factor to the first communication device 10 while the disconnection delaying unit 24 delays the disconnection.

The disconnection factor retaining unit 26 in the first communication device 10 retains the disconnection factor communicated from the second communication device 14, to prepare for a request from the monitoring device 16, and communicates the disconnection factor to the monitoring device 16 when the monitoring device 16 requires same.

Thus, the monitoring device 16 can recognize the disconnection factor at any time after the disconnection, to thereby deal with an abnormal disconnection.

Figure 2:
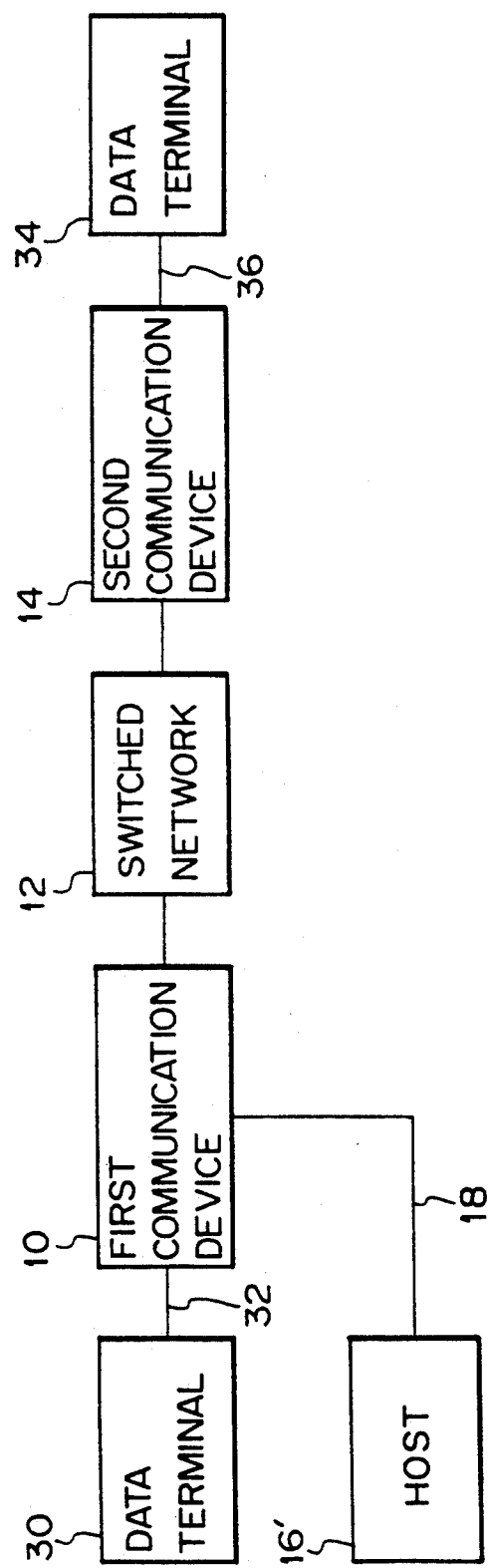
FIG. 2 is a more concrete block diagram of a communication network according to the first embodiment of the present invention.

FIG. 2 is a more concrete block diagram showing a communication network according to the first embodiment of the present invention. A data terminal 30 is connected through a line 32 to the first communication device 10, and a data terminal 34 is connected through a line 36 to the second communication device 14. A host 16' for monitoring/management is connected through a line 18 to the first communication device 10.

Figure 3:
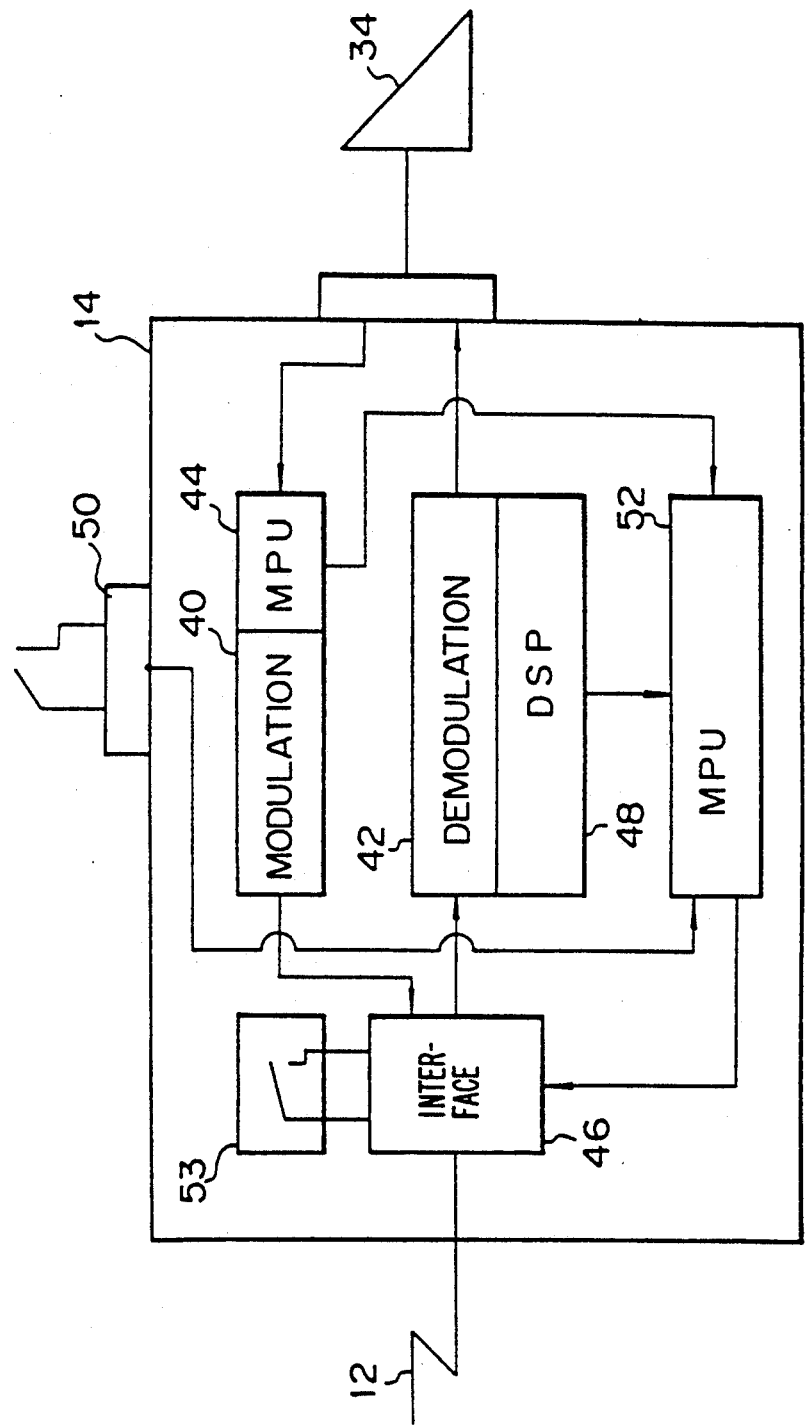
FIG. 3 is a block diagram showing a detailed construction of the second communication device 14 shown in FIG. 2.

FIG. 3 shows a detailed construction of the second communication device 14 shown in FIG. 2. In FIG. 3, the second communication device 14 comprises a modulation part 40 for modulating transmission data, and a demodulation part 42 for demodulating received data. The MPU (micro processor unit) 44 functions to monitor a connection interface signal with the data terminal 34. An interface unit 46 is provided for a connection with the switched network 12, and a line state in the switched network 12 is detected by the interface unit 46 and input to a DSP (digital signal processor) 48, when monitoring the line state in the switched network 12. The switch 50 allows a manual disconnection. The MPU 44, the switch 50 and the DSP 48 detect the aforementioned disconnection factors i) to iii), respectively, and thus comprise an implementation of the disconnection factor detecting unit 20 described with reference to FIG. 1, as a whole.

An MPU 52 is connected to the MPU 44, switch 50, and the DSP 48, and when the MPU 52 receives the disconnection factor detected in the MPU 44, the switch 50, or the DSP 48 from the respective connecting line, the MPU 52 does not immediately send a disconnect command to the interface unit 40 using a switch 53, but communicates the disconnection factor through the interface unit 46 and the switched network 12 to the first communication device 10 (FIG. 2), by using a frequency band lower than that of the user data communication. After the communication of the disconnection factor is completed, the MPU 52 commands the interface unit 46 to disconnect using the switch 53, and thus the MPU 52 implements the disconnection communicating unit 22 and the disconnection delaying unit 24 described with reference to FIG. 1.

Figure 4:
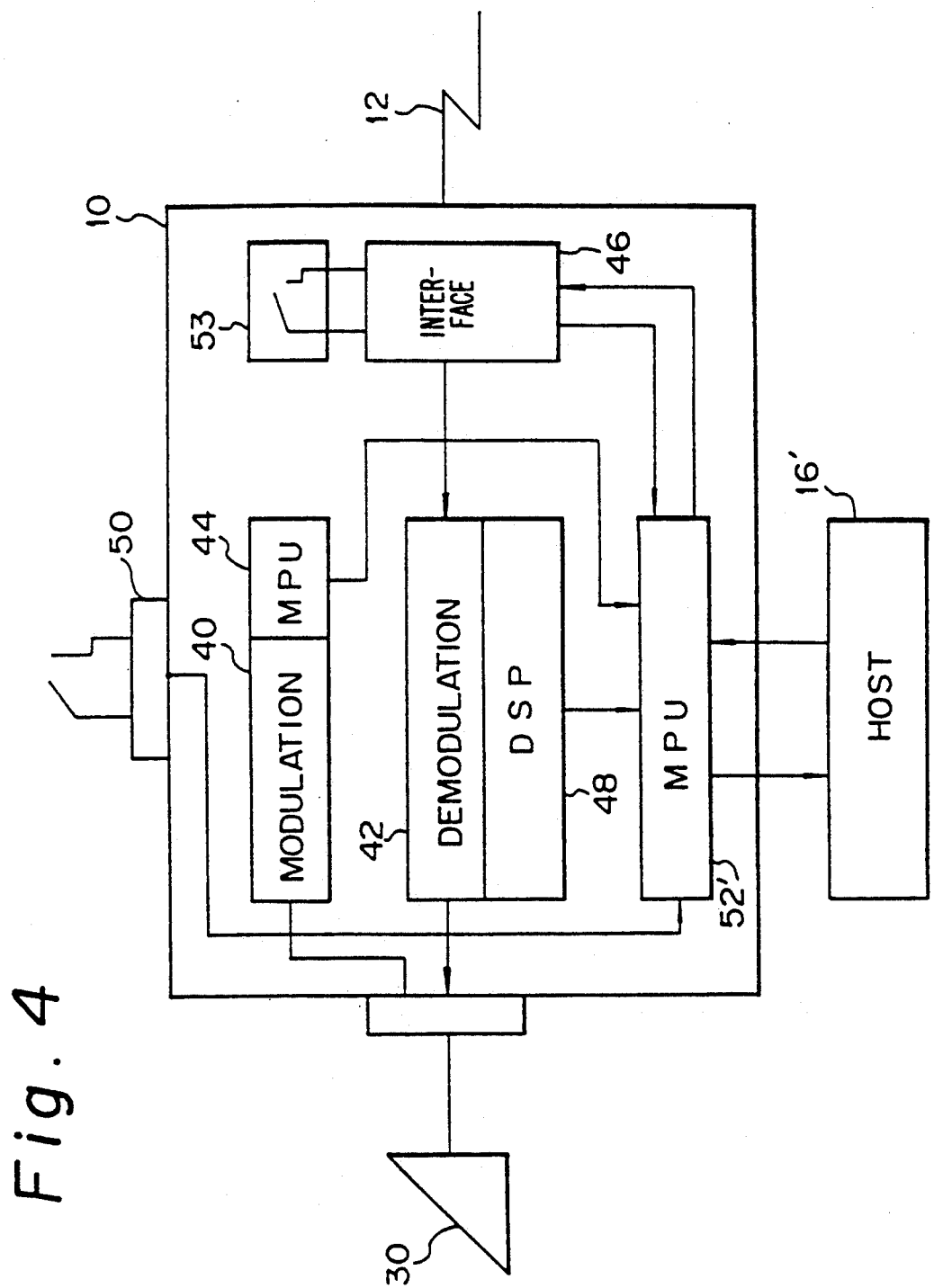
FIG. 4 is a block diagram showing a detailed construction of the first communication device 10 shown in FIG. 2.

FIG. 4 shows a detailed construction of the first communication device 10. The first communication device 10 comprises a modulation part 40, a demodulation part 42, a switch 53, an interface unit 46, an MPU 44, a DSP 48, and a switch 50, which operate similarly to those corresponding elements of the second communication device 14. An MPU 52' retains the disconnection factor detected in the MPU 44, the switch 50, or the DSP 48 of the first communication device, and the disconnection factor communicated from the second communication device 14, in a storage part (e.g. a memory) thereof. In addition, MPU 52' of the first communication device 10 communicates the retained disconnection factor to the host 16' for monitoring/management, in reply to a request from the host 16', or in the absence of such a request.

The operations of the first and second communication devices 10 and 14 are now described.

When the MPU 44, the switch 50, or the DSP 48 in the second communication device 14 detects a disconnection factor, the second communication device 14 communicates the disconnection factor through the interface unit 46 and the switched network 12 to the first communication device 10, while delaying the disconnection. The first communication device 10 retains the disconnection factor communicated from the second communication device 14 in a storage thereof, and communicates the retained disconnection factor to the host 16' in reply to a request from the host 16' or in the absence of such a request, and thus the host 16' can recognize the disconnection factor at any time after a disconnection in the switch network 12, to thereby cope with an abnormal disconnection.

Two-Way Communication of Monitor/Management Information

FIGS. 5A to 5D show a basic concept of a two-way communication of monitor/management information in a communication network according to a second embodiment of the present invention.

Figure 5A:
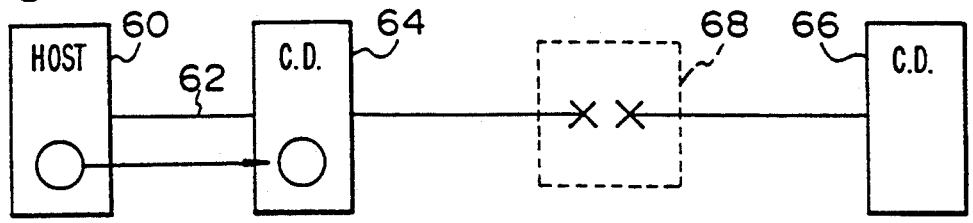
FIGS. 5A to 5D are diagrams showing a basic concept of two-way communication of monitor/management information in a communication network according to a second embodiment of the present invention.
Figure 5B:
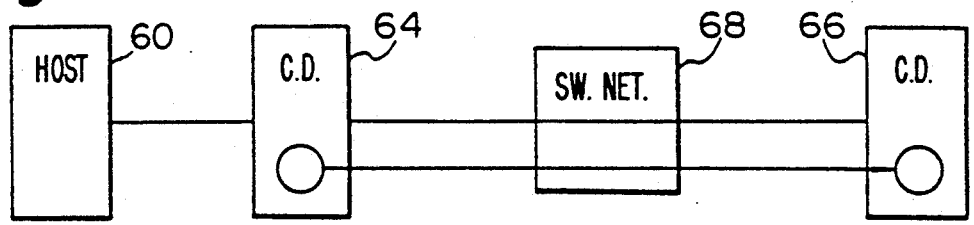

As shown in FIG. 5A, monitor/management information is transmitted from a host 60 through a line 62 to a first communication device ("C.D.") 64, and is retained in the first communication device 64. Thereafter, as shown in FIG. 5B, when the first communication is called from a second communication device ("C.D.") 66 and the first and second communication devices 64 and 66 are connected to each other in a switched network ("SW. NET.") 68, the monitor/management information retained in the first communication device 64 is transmitted to the second communication device 66 before the user data communication is started.

Figure 5C:
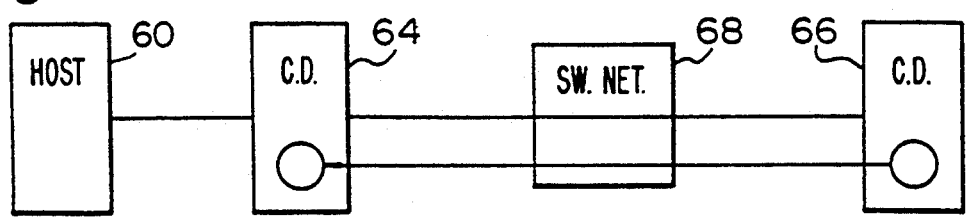

As shown in FIG. 5C, when the first communication device 64 is called from the second communication device 66 and the first and second communication devices 64 and 66 are connected to each other in the switched network 68, monitor/management information is transmitted from the second communication device 66 to the first communication device 64 before the user data communication is started, and is retained in the first communication device 64.

Figure 5D:
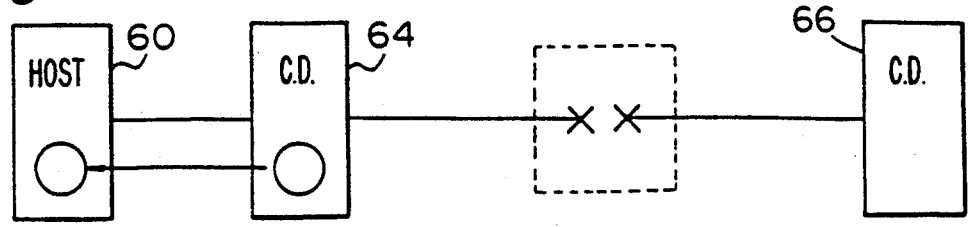

Thereafter, when the host 60 interrogates the first communication device 64, the monitor/management information retained in the first communication device 64 is transmitted from the first communication device 64 to the host 60, as shown in FIG. 5D.

FIG. 6 is a block diagram showing a basic concept of a construction of the first communication device 64 where a single second communication device 66 is to be connected through the switched network 68 and when the host 60 communicates information to the second communication device 66.

In FIG. 6, the first communication device 64 comprises a receiving unit 70 for receiving monitor/management information from the host 60 through the line 62, a retaining unit 72 for retaining the monitor/management information received by the receiving unit 70, and a transmitting unit 74 for transmitting the monitor/management information retained in the retaining unit 72 when the second communication device 66 is connected to the first communication device 64 through the switched network 68.

Figure 7:
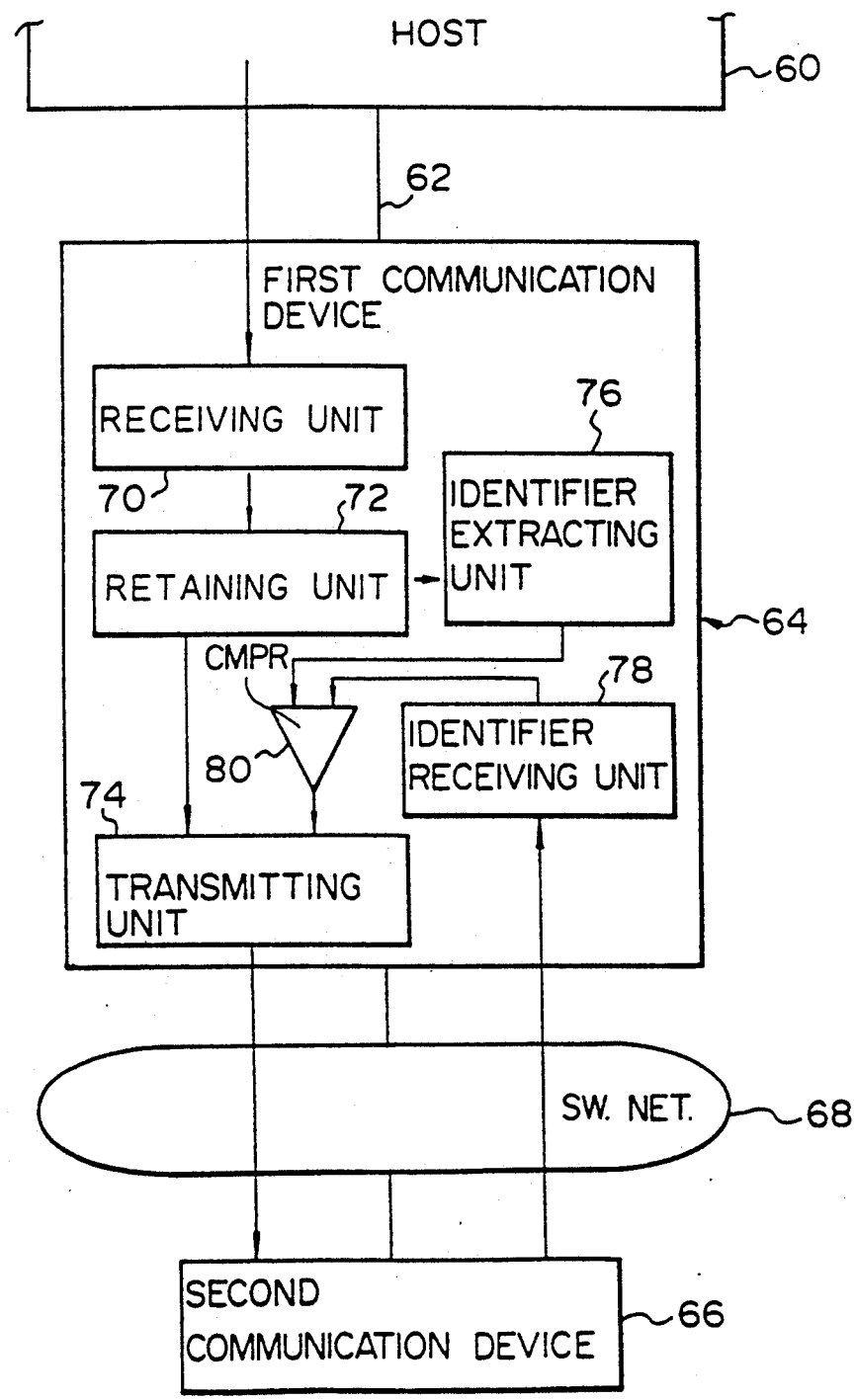

FIG. 7 is a block diagram showing a basic concept of a construction of the first communication device 64 where a plurality of second communication devices 66 are to be connected through the switched network ("SW. NET.") 68 and where the host 60 communicates information to one of the second communication devices 66.

In FIG. 7, the first communication device 64 comprises a receiving unit 70 for receiving monitor/management information including an identifier for identifying a communication device from the host 60 through the line 62, a retaining unit 72 for retaining the information received by the information receiving unit 70, an identifier extracting unit 76 for extracting the identifier of the communication device from the information retained in the retaining unit 72, an identifier receiving unit 78 for receiving an identifier of a second communication device 66 when the second communication device 66 is connected through the switched network 68, a comparator ("CMPR") 80 for comparing the identifier extracted by the identifier extracting unit 76 with the identifier received by the identifier receiving unit 78, and a transmitting unit 74 for transmitting the information retained in the retaining unit 72 to the second communication device 66 when the two identifiers coincide with each other in the comparator 80.

Figure 8:
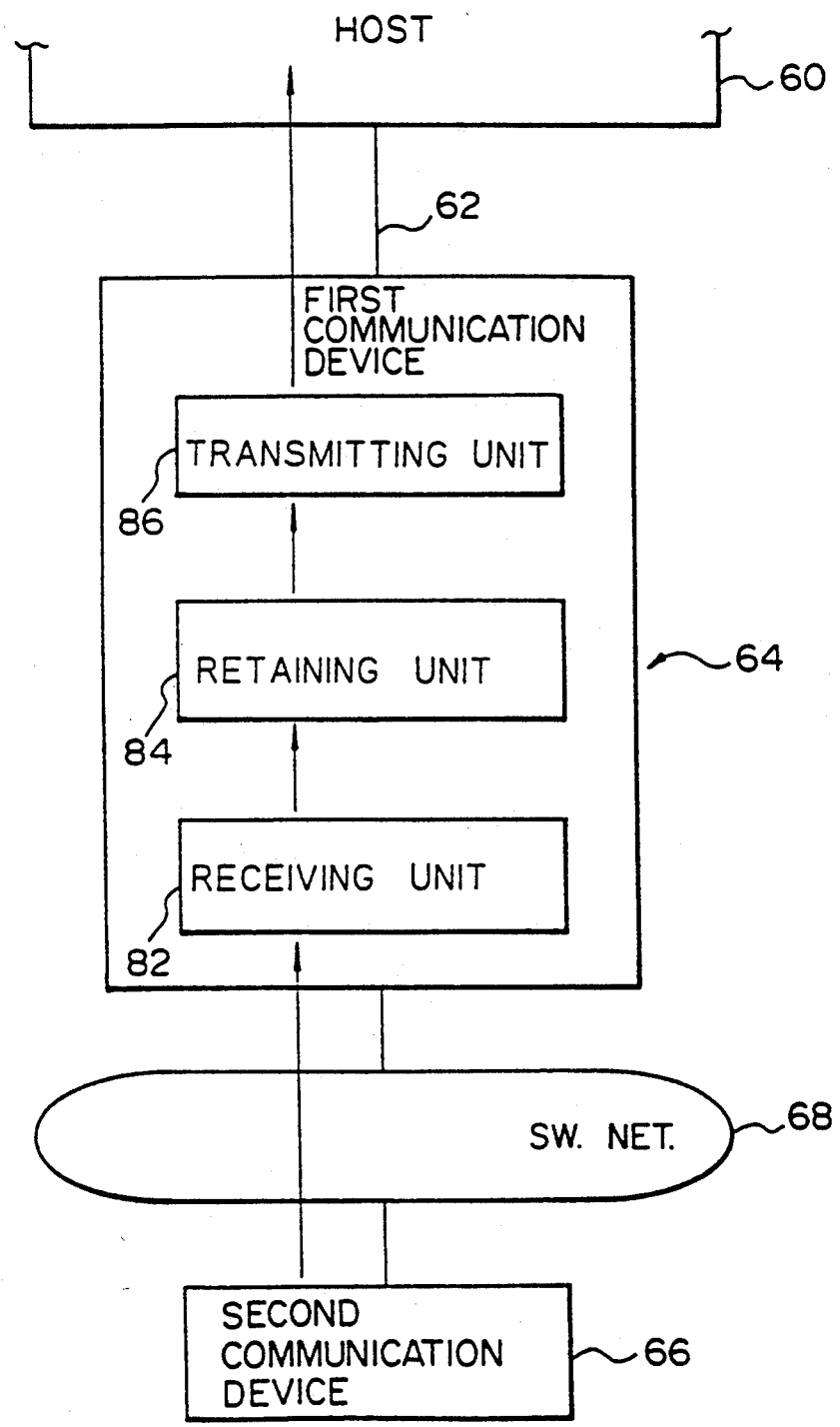

FIG. 8 is a block diagram showing a basic concept of a construction of the first communication device 64 where a single second communication device 66 is to be connected through the switched network ("SW. NET.") 68 and where the second communication device 66 communicates information to the host 60.

In FIG. 8, the first communication device 64 comprises a receiving unit 82 for receiving monitor/management information from the second communication device 66 when the second communication device 66 is connected through the switched network 68 to the first communication device 64, a retaining unit 84 for retaining the information received by the information receiving unit 82, and a transmitting unit 86 for transmitting the information retained in the information retaining unit 84 to the host 60.

Figure 9:
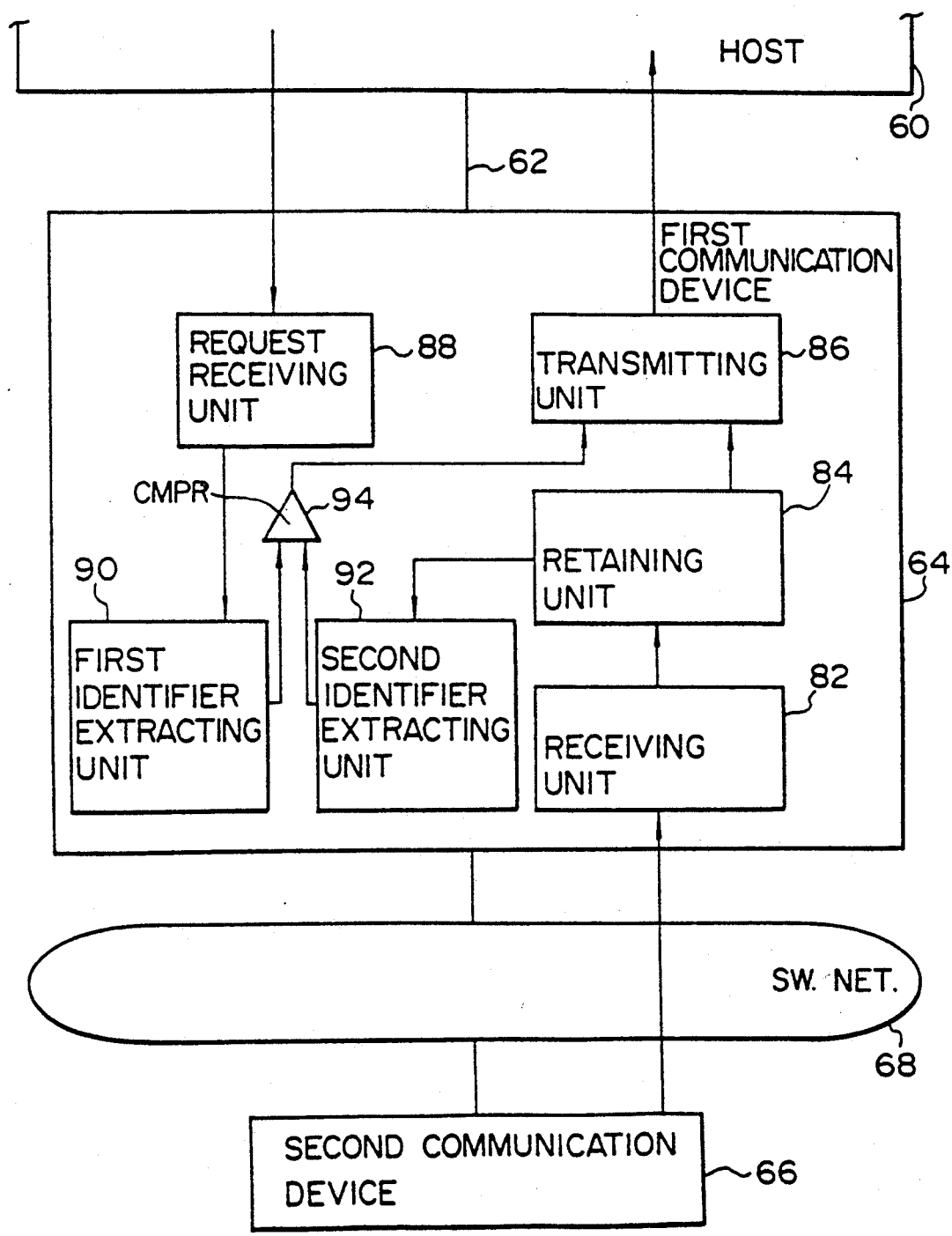

FIG. 9 is a block diagram showing a basic concept of a construction of the first communication device 64 where a plurality of second communication devices 66 are to be connected through the switched network ("SW. NET.") 68 and where one of the second communication devices communicates information to the host 60.

In FIG. 9, the first communication device 64 comprises a receiving unit 82 for receiving monitor/management information from the second communication device 66 when the second communication device 66 is connected through the switched network ("SW. NET.") 68 to the first communication device 64, a retaining unit 84 for retaining the information received by the information receiving unit 82, a request receiving unit 88 for receiving a request issued by the host 60, a first identifier extracting unit 90 for extracting an identifier of a second communication device from the request received by the request receiving unit 88, a second identifier extracting unit 92 for extracting an identifier of a second communication device from the information retained in the information retaining unit 84, a comparator ("CMPR") 94 for comparing the identifier extracted by the first identifier extracting unit 90 with the identifier extracted by the second identifier extracting unit 92, and a transmitting unit 86 for transmitting the information retained in the information retaining unit 72 and corresponding to the identifier which coincides with the identifier extracted by the first identifier extracting unit 90 in the comparator 94.

Figure 10:
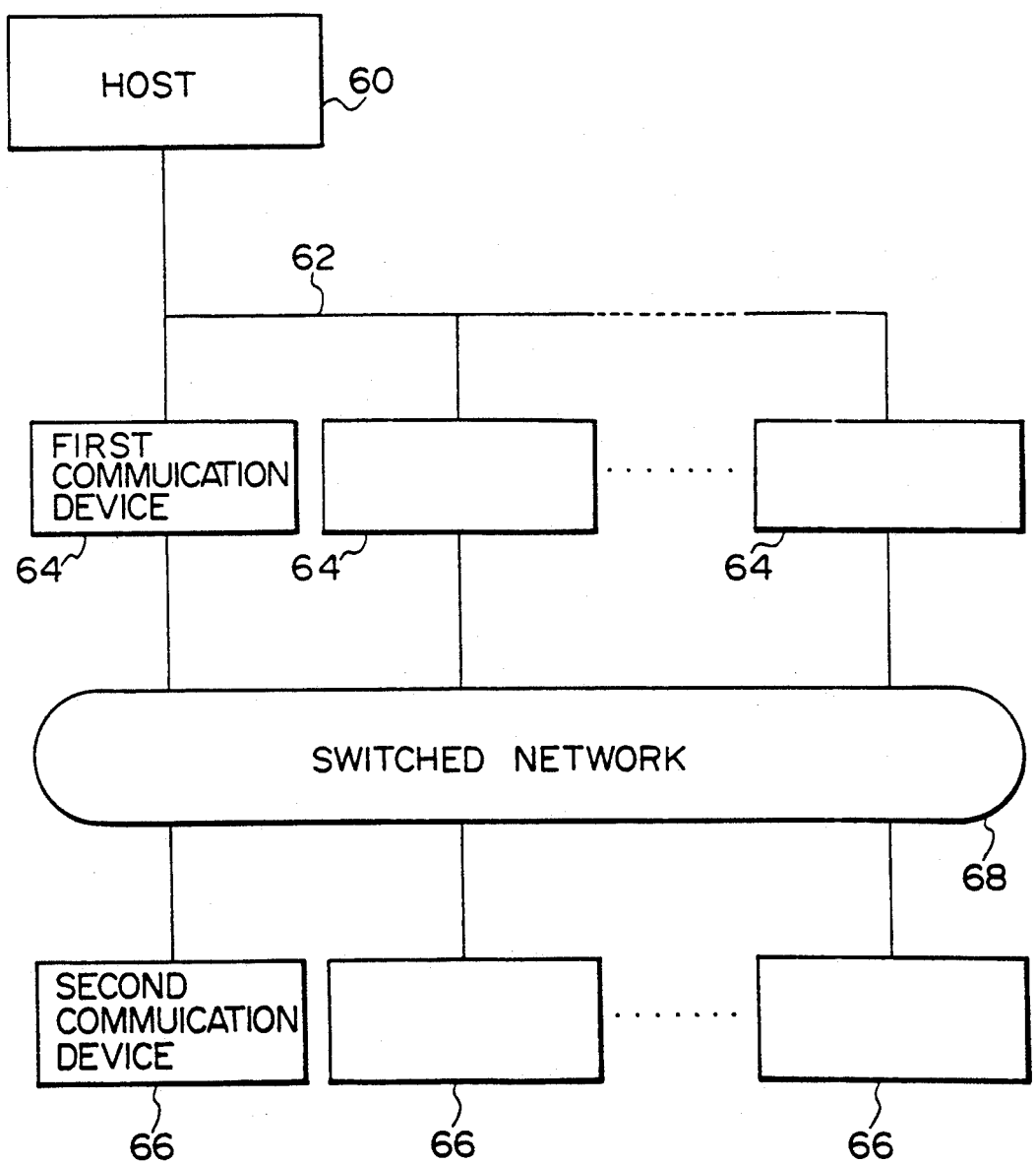
FIG. 10 is a block diagram showing an example of a communication network according to the second embodiment of the present invention.

FIG. 10 is a diagram showing an actual example of a communication network including a plurality of second communication devices 66 connected through a switched network 68 to the first communication device 64 connected through private or leased lines 62 to a host 60 for monitor/management.

Figure 11:
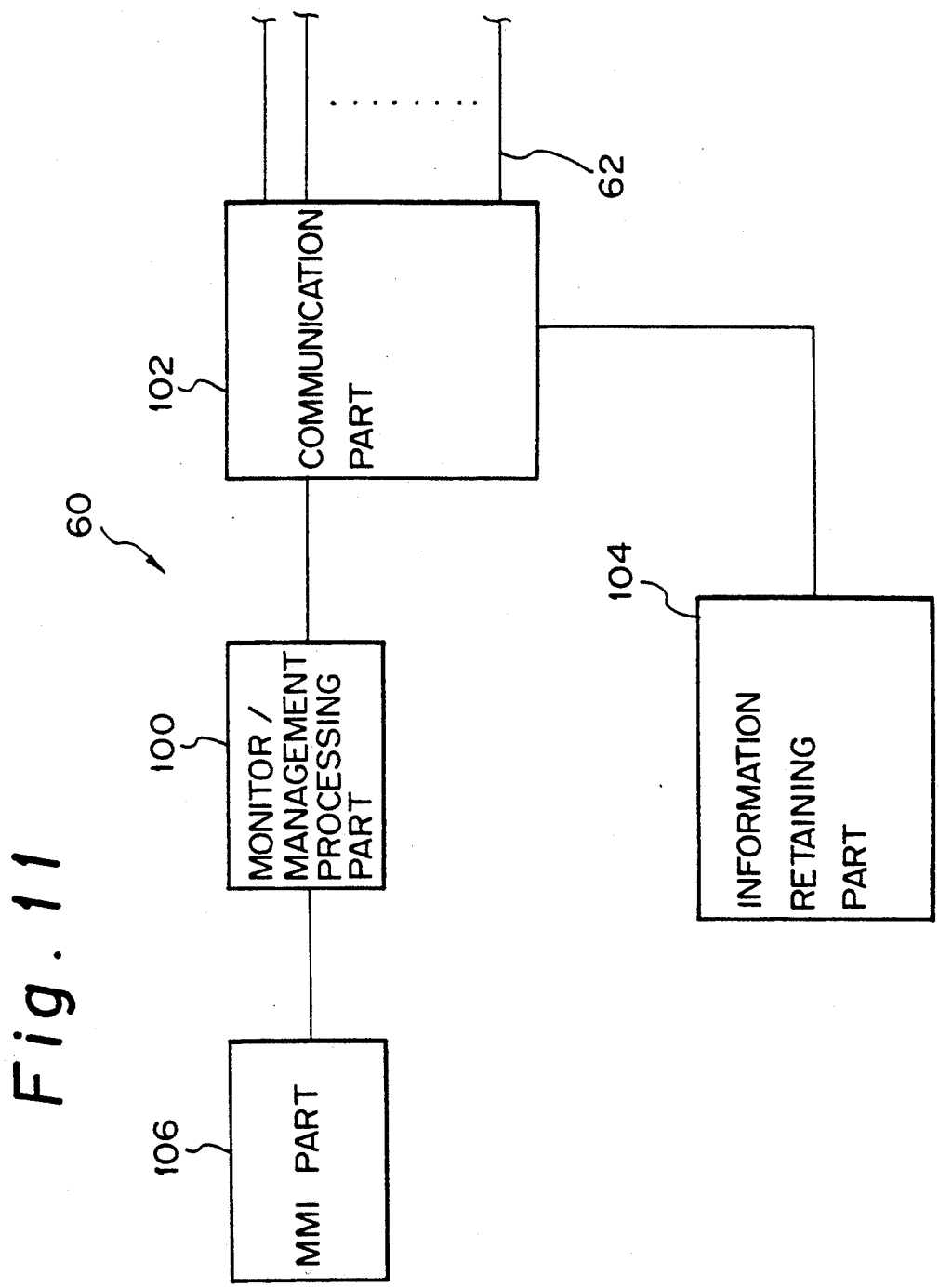
FIG. 11 is a block diagram showing a detailed construction of the host 60 shown in FIG. 10.
Figure 12:
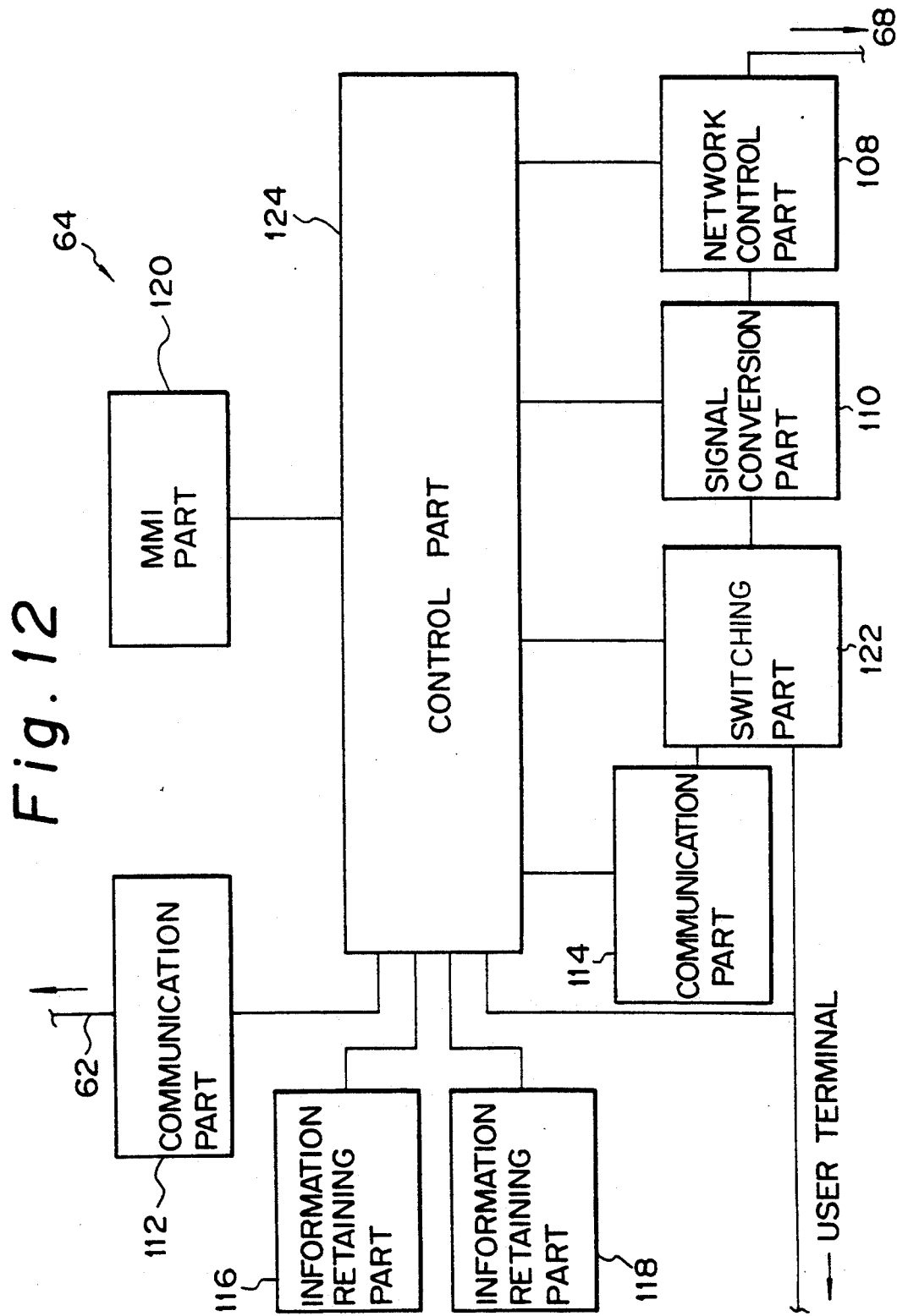
FIG. 12 is a block diagram showing a detailed construction of the first communication device 64 shown in FIG. 10.
Figure 13:
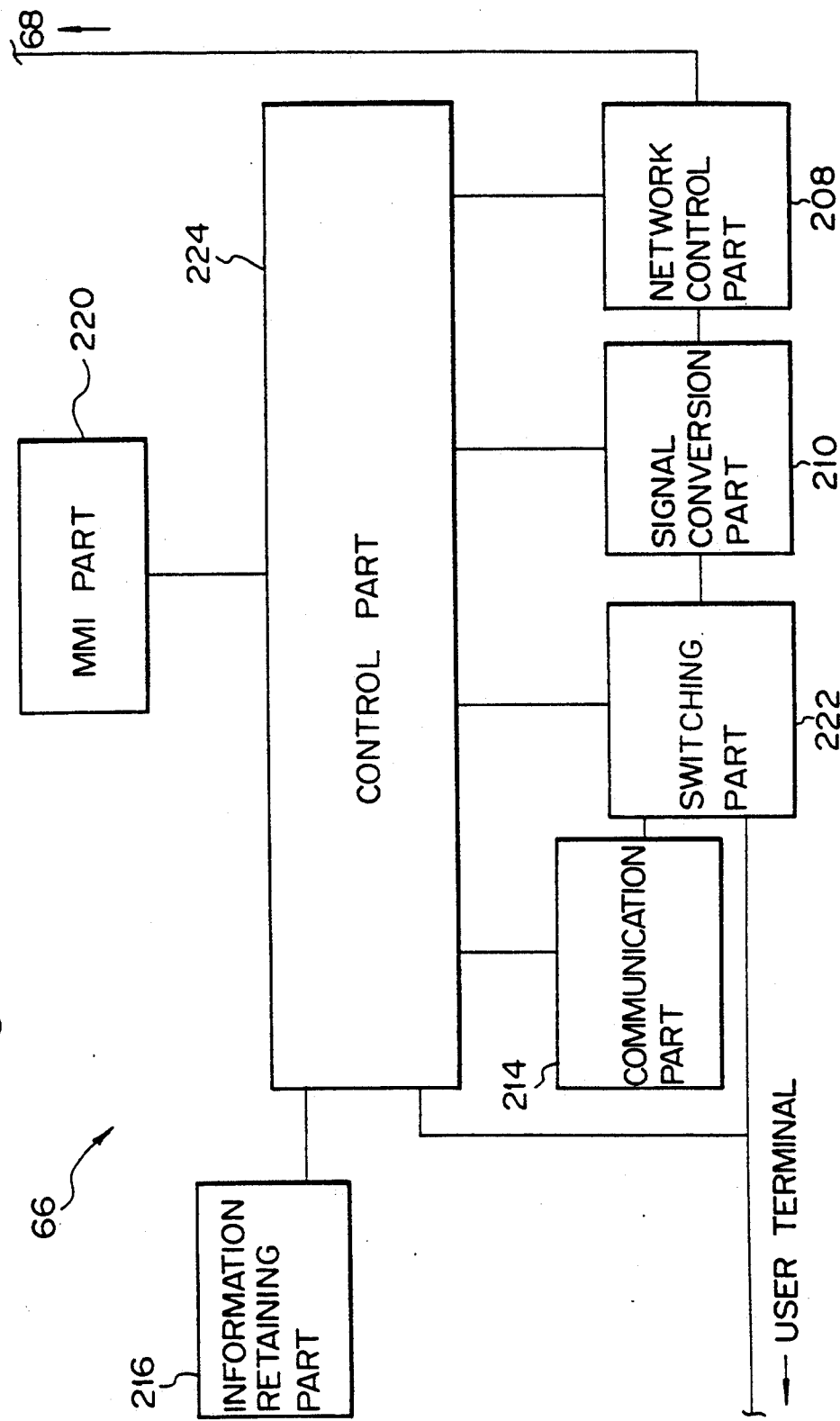
FIG. 13 is a block diagram showing a detailed construction of the second communication device 66 shown in FIG. 11.

FIGS. 11 to 13 show examples of constructions of the host 60, the first communication device 64 and the second communication device 66, respectively. These constructions are explained as follows /* FIG. 11: host 60 */

Monitor/management processing part 100

A monitor/management processing part 100 monitors and controls the first communication device 64 and the second communication device 68. To perform these functions, the monitor management processing part 100 inputs information, such as data input from a keyboard and a mouse, from an MMI part 106, information, such as identifiers, types, set conditions, days and times of events, and installation locations of the first and the second communication devices 64 and 66, retained in an information retaining part 104, and monitor/management information received in a communication part 102 from the first and the second communication devices 64 and 66. Also, the monitor/management processing part 100 outputs information through the MMI processing part 106 to MMI (Man Machine Interface) devices, such as a display and keyboard, new monitor/management information to the information retaining part 104, and new monitor/management information through the communication part 102 to the monitored communication devices.

Communication part 102

The communication part 102 receives the monitor/management information from the monitor/management processing part 100, extracts the identifier of a device to be monitored from the information, and reads out information corresponding to the identifier from the information retaining part 104.

If the device to be monitored is the first or second communication device 64 or 66, the communication part 102 transmits the monitor/management information to the first communication device 64 according to a predetermined protocol. Also, the communication part 102 receives information transmitted from the first communication device 64 according to a predetermined protocol, and determines whether or not the received information includes information transmitted from the second communication device 66. If the received information includes information from the second communication device 66, the communication part 102 outputs that information to the monitor/management processing part 100.

Information retaining part 104

The information retaining part 104 retains information about devices to be monitored, and the retained information is renewed by the monitor/management part 100.

MMI part 106

The MMI part 106 includes input/output devices, such as a keyboard, a mouse, a display, and a printer.

/* FIG. 12: first communication device 64 */

Network control part 108

A network control part 108 inputs a network control signal from the switched network 68 and outputs the signal to a control part 124, and inputs another network control signal from the control part 124 and outputs that signal to the switched network 68, to perform control of the switched network 68.

In this control, when the second communication device 66 is connected to the first communication device 64, the network control part 108 receives transmitted signal for the second communication device 66 from a signal conversion part 110 and sends that signal to the switched network 68. In addition, the network control part 108 receives a signal transmitted from the second communication device 66 and outputs that signal to the signal conversion part 110.

Signal conversion part 110

The signal conversion part 110 converts a digital signal input from a switching part 122 into an analog signal to be output to the network control part 108, and converts an analog signal input from the network control part 108 into a digital signal to output the digital signal to the switching part 122.

In addition, the signal conversion part 110 measures an S/N ratio and a signal level, etc. of the analog signal input from the network control part 108, and outputs the measurement results to the control part 124 as status information.

Communication part 112

The communication part 112 is always connected through the private or leased line 62 to the host 60, and receives the transmitted information from the host 60 according to a predetermined protocol, to output the information to the control part 124.

Also, communication part 112 inputs the monitor/management information from the control part 124 and transmits the information to the host 60 according to a predetermined protocol.

Communication part 114

A communication part 114 receives the monitor/management information to be sent to the second communication device 66 from the control part 124 and outputs the information through the switching part 122 and signal conversion part 110 to the network control part 108.

Also, the communication part 114 inputs the monitor/management information received by the network control part 108 through the switching part 122 and the signal conversion part 110, and outputs the information to the control part 124.

Information retaining part 116

An information retaining part 116 retains information about set conditions and states of the communication device itself. The retained information is renewed by the control part 124 and is output to the control part 124 in response to a request.

Information retaining part 118

An information retaining part 118 retains information about the second communication devices 66. The information includes identifiers of the second communication devices 66 and the monitor/management information to be sent to the host 60 and the second communication devices 66. The retained information is renewed by the control part 124 and is output to the control part 124 in response to a request.

MMI part 120

An MMI part 120 includes input/output devices such as a keyboard, a mouse, a display, and a printer. The MMI part 120 is connected to the control part 124.

Switching part 122

The switching part 122 is controlled by the control part 124, and connects the signal conversion part 110 to either the communication part 114 or a user terminal.

Control part 124

The control part 124 controls each of the parts in the communication device.

The control part 124 receives network control information from the network control part 108, status information from the signal conversion part 110, received information from the communication part 112, received information from the communication part 114, input information from the MMI part 120, and network control information such as a connection request and disconnection request from the user terminal.

Also, the control part 124 inputs information from and outputs information to the information retaining parts 116 and 118.

In addition, the control part 124 outputs control information to the network control part 108, the signal conversion part 110, and the switching part 122, transmits information to the information communication parts 112 and 114, display information to the MMI part 120, and information including a line state to the user terminal.

/* FIG. 13: first communication device 66 */

Network control part 208

A network control part 208 inputs a network control signal from the switched network 68 and outputs that signal to a control part 224, and inputs another network control signal from the control part 224 and outputs that signal to the switched network 68, to perform control of switched network 68.

In this control, when the first communication device 64 is connected to the second communication device 66, the network control part 208 receives a signal to be transmitted to the first communication device 64 from a signal conversion part 210 and sends that signal to the switched network 68. In addition, the network control part 208 receives a signal transmitted from the first communication device 64 and outputs that signal to the signal conversion part 210.

Signal conversion part 210

The signal conversion part 210 converts a digital signal input from the switching part 222 into an analog signal to be output to the network control part 208, and converts an analog signal input from the network control part 208 into a digital signal to output the digital signal to the switching part 222.

In addition, the signal conversion part 210 measures an S/N ratio and a signal level, etc. of the analog signal input from the network control part 108, and outputs the measurement results to the control part 224 as status information.

Communication part 214

A communication part 214 receives the monitor/management information to be sent to the first communication device 64 from the control part 224 and outputs the information through the switching part 222 and signal conversion part 210 to the network control part 208.

Also, the communication part 214 inputs the monitor/management information received by the network control part 208 through the switching part 222 and the signal conversion part 208, and outputs the information to the control part 224.

Information retaining part 216

An information retaining part 216 retains information about set conditions and states of the communication device itself. The retained information is renewed by the control part 224 and is output to the control part 224 in response to a request.

MMI part 220

An MMI part 220 includes input/output devices such as a keyboard, a mouse, a display, and a printer. The MMI part 220 is connected to the control part 224.

Switching part 222

The switching part 222 is controlled by the control part 224, and connects the signal conversion part 210 to either the communication part 114 or an user terminal.

Control part 224

The control part 224 controls each of the parts in the communication device.

The control part 224 receives network control information from the network control part 208, state information from the signal conversion part 210, received information from the communication part 214, input information from the MMI part 220, and network control information from the user terminal.

Also, the control part 224 inputs information from and outputs information to the information retaining part 216.

In addition, the control part 224 outputs control information to the network control part 208, the signal conversion part 210, and the switching part 222, transmitted information to the information communication part 214, displayed information to the MMI part 220, and information including a line state to the user terminal.

Figure 14:
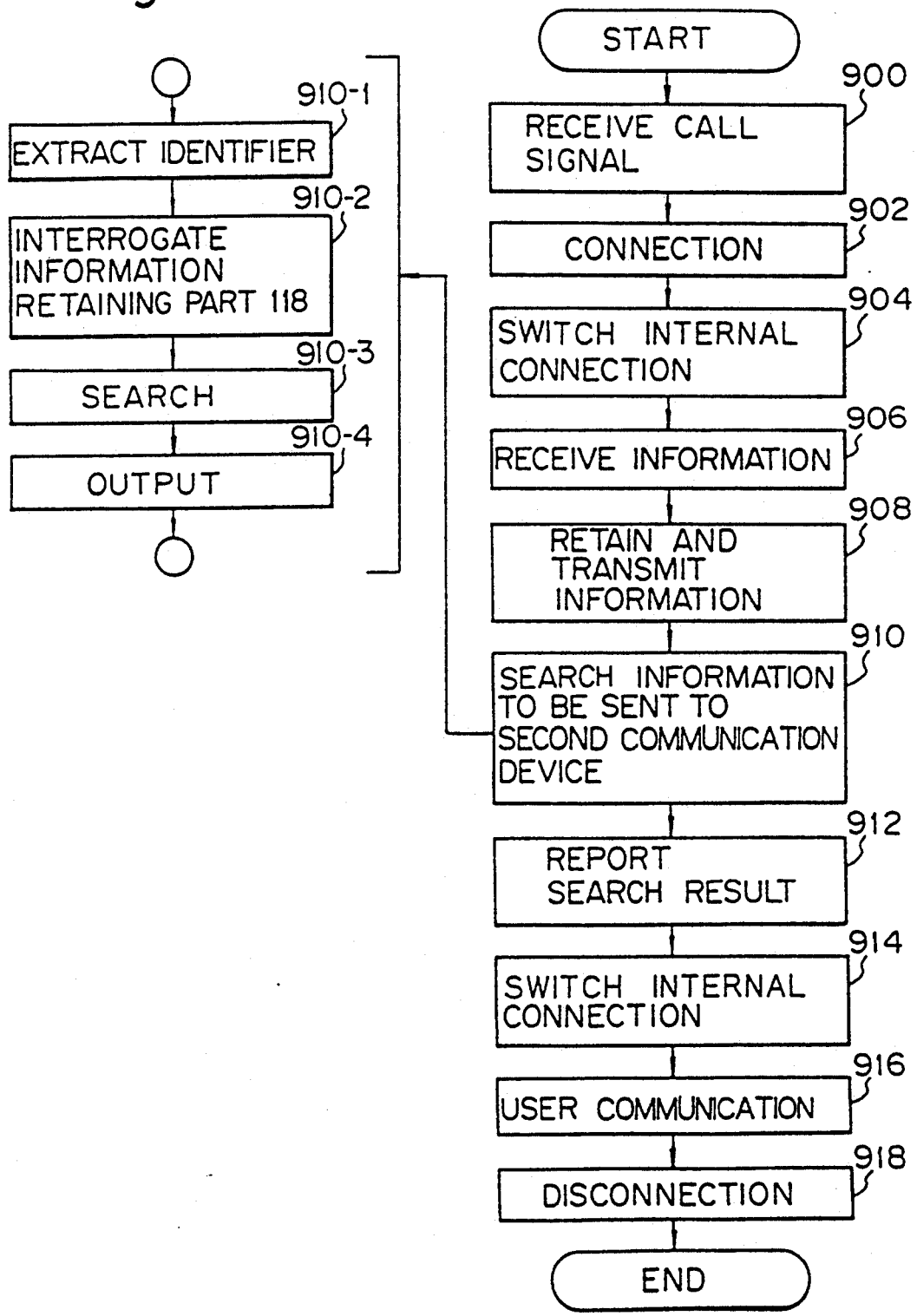
FIG. 14 is a flowchart showing an operation of a communication between the first communication device and the second communication device.
Figure 15:
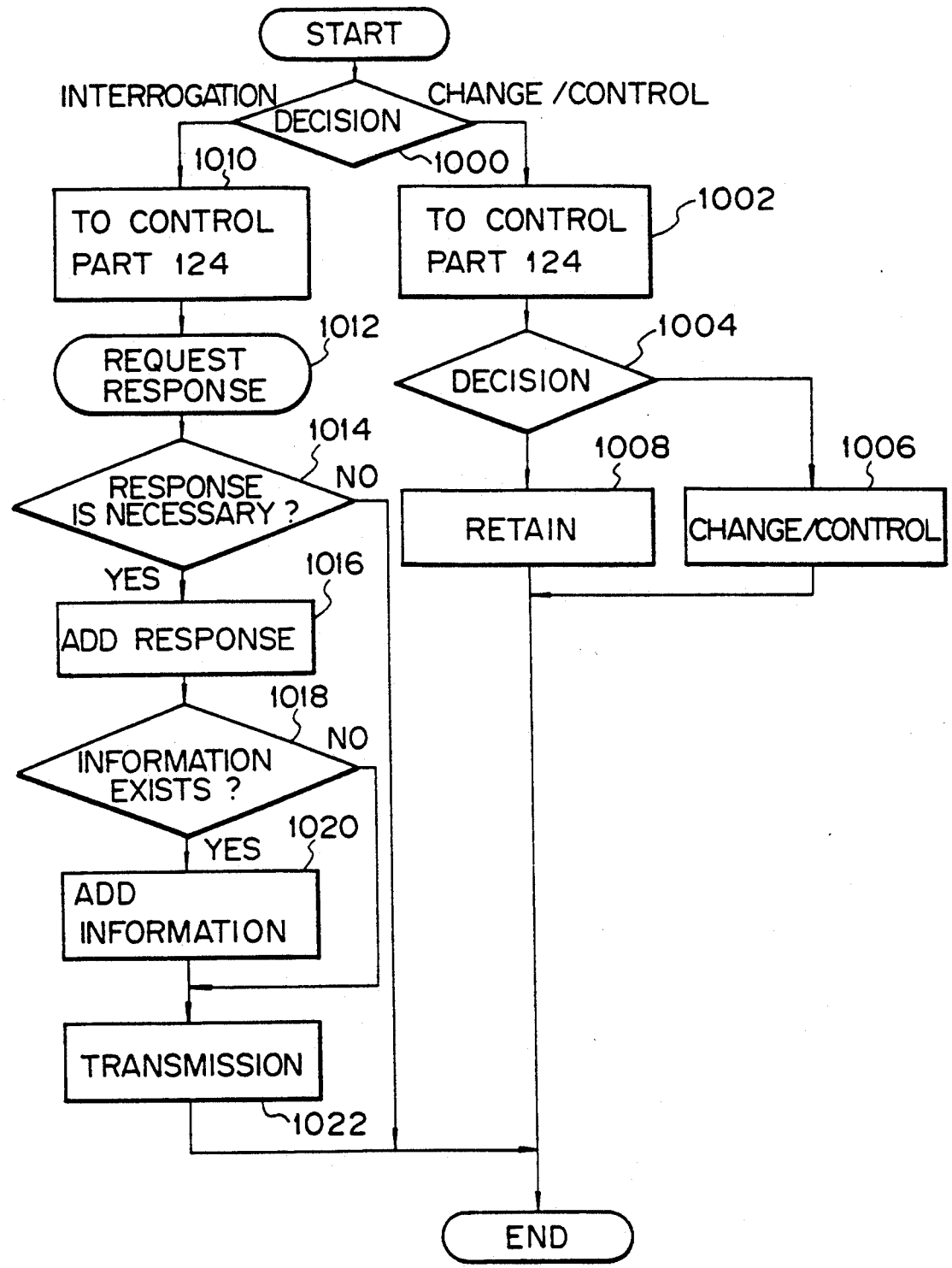
FIG. 15 is a flowchart showing an operation of a communication between first communication device and the host.
Figure 16:
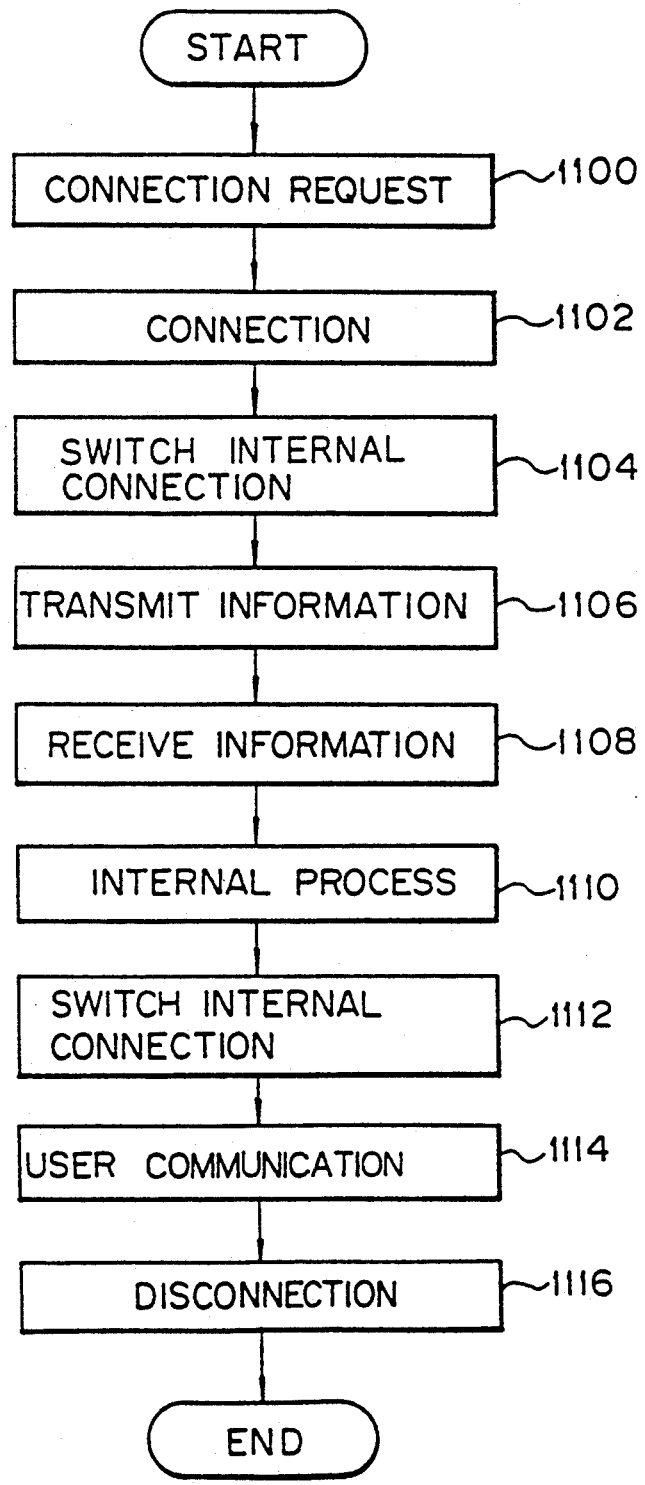
FIG. 16 is a flowchart showing an operation of a communication at the second communication device.

FIGS. 14 to 16 are flow charts explaining a communication operation of the first communication device 64 with the second communication device 66, a communication operation of the first communication device 64 with the host 60, and a communication operation of the second communication device 66, respectively. There operations are successively explained in the following description.

/* FIG. 14: first communication device 64 with second communication device 66 */

Step 900

The network control part 108 receives a call signal from the second communication device 66 and communicates the call to the control part 124.

Step 902

The control part 124 reads out information about this communication device from the information retaining part 116 and outputs the control information to the network control part 108 when allowing connection. The network control part 108 executes connection control according to the control information. After completion of a connection with the second communication device is confirmed, the network control part 108 reports the completion to the control part 124. In addition, the network control part 108 connects the signal conversion part 110 to the switched network 68.

Step 904

The control part 124 makes the switching part 122 select the communication part 114 by outputting control information to the switching part 122 when the control part 124 is informed of the completion of the connection from the network control part 108, and thus status information representing line state is sent to the information retaining part 116.

Step 906

After the connection is completed, first the second communication device 66 transmits monitor/management information. The monitor/management information includes an identifier assigned to that second communication device. The information is received in the communication part 114 and is output to the control part 124.

Step 908

The control part 124 determines whether or not the received information includes information to be sent to the host 60. If the received information includes the information to be sent to the host 60, the control part 124 extracts the information from the received information and outputs that information to the communication part 112.

Also, the information retaining part 118 retains this information.

Step 910

The control part 124 extracts an identifier of the second communication device which transmitted the information, from the received information (Step 910-1), and interrogates the information retaining part 118 to determine whether or not monitor/management information for the second communication device corresponding to the identifier has been received from the host 60 and is retained (step 910-2).

The information retaining part 118 searches for the monitor/management information to be sent to the second communication device which called, using the identifier (step 910-3), and outputs the result of search to the control part 124 (step 910-4). The result includes the information itself, if found.

Step 912

The control part 124 outputs the search result to the communication part 114, which transmits the search result to the second communication device which called.

Step 914

The control part 124 reports the line state (completion of connection) to the user terminal. Also, the control part 124 outputs control information to the switching part 122 to make it select the user terminal instead of the communication part 114.

Step 916

The user terminal starts to communicate with the second communication device after receiving the report of a connection from the control part 124. When finishing the communication, the user terminal issues a disconnection request to the control part 124.

Step 918

When receiving the disconnection request, the control part 124 outputs control information for a disconnection to the network control part 108, and outputs status information of the disconnection to the information retaining part 116.

/* FIG. 15: first communication device 64 with host 60 */

Step 1000

When receiving monitor/management information from the host 60, the communication part 112 determines whether the host 60 requires a change of set condition/control, or an interrogation of the state.

Step 1002

When the host 60 requires a change of set condition/control, the communication part 112 outputs the requirement and received information to the control part 124.

Step 1004

The control part 124 determines whether a destination of the received information is this first communication device 64 or the second communication device 66 to be connected to this first communication device 64.

Step 1006

If the designation of the received information is this communication device, the control part 124 executes the change of set condition/control by outputting necessary information according to the content of the received information.

Step 1008

If the destination of the received information is the second communication device, the control part 124 outputs the received information to the information retaining part 118.

Since the received information includes the aforementioned identifier, the received information is transmitted to the second communication device 66 when the corresponding communication device is connected, to thus allow a user communication.

Step 1010

If the host 60 requires an interrogation of the state, the communication part 112 outputs the requirement and the received information to the control part 124.

Step 1012

When the control part 124 receives the information, the control part 124 requests a response from the communication part 112 to the host 60, and the communication part 112 transmits the response to the host 60.

Step 1014

The control part 124 reads out status information and set information about this first communication device from the information retaining part 116. The control part 124 compares values of the status information with threshold values in the set information, and determines whether or not a response to the host 60 is necessary, according to the comparison results.

Step 1016

If the response to the host 60 is necessary, the control part 124 adds the response to the information to be transmitted.

Step 1018

The control part 124 carries out an interrogation of the information retaining part 118 to determine part whether or not information received from the second communication device having an identifier coinciding with the identifier included in the request of the host 60 is retained, and receives the results of the interrogation from the communication part 118.

Step 1020

If the control part 124 receives the information from the second communication device 66, the control part 124 adds the information to the information to the transmitted.

Step 1022

The control part 124 delivers the information to be transmitted to the communication part 112 and commands the communication part 112 to transmit same.

As mentioned above, among the monitor/management information received from the second communication devices 66 and retained therein, only the monitor/management information about the second communication device specified by host 60 with the identifier during the interrogation is transmitted to the host 60.

/* FIG. 16: second communication device */

Step 1100

When a user communication is desired, the user terminal outputs a network control signal to the control part 224, and the control part 224 receives the network control signal.

Step 1102

The control part 224 outputs a connection request to the network control part 208, the network control part 208 sends a call signal to the switched network 68, and thereafter, receives a connection completion signal from the switched network 68. Then, the network control part 208 communicates the connection completion to the control part 224 and connects the signal conversion part 210 to the network 68.

Step 1104

When the control part 224 confirms the connection completion by the communication from the network control part 208, the control part 224 outputs control information to the switching part 222 to make the switching part 222 select the communication part 214.

The control part 224 outputs status information representing the connection to the information retaining part 216, and the information retaining part 216 retains the information.

Step 1106

The control part 224 outputs monitor/management information including an identifier assigned to this communication device to the communication part 214.

The control part 224 reads out status information and set information about this communication device from the information retaining part 216, compares the values of the status information with threshold values in the set information, and adds the information to the above monitor/management information if a communication to the host 60 is necessary according to the comparison results.

The information communication part 214 transmits the monitor/management information received from the control part 224 to the switched network 68, and the transmitted information is received and retained in the first communication device 64, as mentioned before.

Step 1108

The communication part 214 receives the monitor/management information transmitted by the first communication device through the switched network 68, and outputs the monitor/management information to the control part 224.

Step 1110

When receiving the monitor/management information from the communication part 214, the control part 224 determines whether or not the information includes monitor/management information transmitted from the host 60 and, if included, executes a control and change of set conditions by outputting necessary information to each of the parts, according to the contents of the information.

Step 1112

The control part 224 communicates a completion of the connection to the user terminal, and outputs control information to the switching part 222, and the switching part 222 selects the user terminal according to the control information from the control part 224.

Step 1114

After confirming the connection by a communication from the control part 224, the user terminal initiates the user communication with the first communication device 64 and, when the user communication is completed, the user terminal outputs a disconnection request to the control part 224.

Step 1116

The control part 224 outputs network control disconnect information to the network control part 208, which cuts the connection in the switched network 68. The control part 224 outputs status information representing the disconnection to the information retaining part 216, which retains the information.

I claim:

1. A method of communicating a disconnection factor in a communication network including a first communication device, a second communication device connected through a switched network to the first communication device, and a monitoring device connected through a line to the first communication device, comprising the steps of:

detecting the disconnection factor requiring a disconnection of a user communication maintained through the switched network between the first and the second communication devices in the second communication device to obtain a first detected disconnection factor;

transmitting the first detected disconnection factor from the second communication device to the first communication device, without affecting the user communication;

receiving the first detected disconnection factor in the first communication device;

disconnecting the user communication after the transmission of the first detected disconnection factor is completed;

retaining the first detected disconnection factor in the first communication device; and transmitting the first detected disconnection factor from the first communication device through the line to the monitoring device.

2. A method of communicating a disconnection factor as claimed in claim 1, further comprising the steps of:

detecting the disconnection factor requiring the disconnection of the user communication in the first communication device to obtain a second detected disconnection factor;

retaining the second detected disconnection factor in the first communication device; and transmitting the second detected disconnection factor from the first communication device to the monitoring device.

3. A method of communicating a disconnection factor as claimed in claim 1, wherein the user communication uses a first frequency band and the first detected disconnection factor is transmitted by using a second frequency band lower than the first frequency band.

4. A first communication device, to be connected through a switched network to a second communication device and connected through a line to a monitoring device, comprising:

receiving means for receiving a first disconnection factor transmitted from the second communication device through the switched network, without affecting a user communication maintained through the switched network between the first and the second communication device;

retaining means for retaining the first disconnection factor received in the receiving means; and transmitting means for transmitting the retained disconnection factor through the line to the monitoring device, in response to a requirement.

5. A first communication device as claimed in claim 4, further comprising:

detecting means for detecting a second disconnection factor requiring a disconnection between the first and the second communication devices; and said retaining means, further, retaining the second disconnection factor detected by the detecting means.

6. A communication device as claimed in claim 4, wherein the user communication uses a first frequency band and the receiving means receives the first disconnection factor by using a second frequency band lower than the first frequency band.

7. A second communication device, to be connected through a switched network to a first communication device connected through a line to a monitoring device, comprising:

detecting means or detecting a disconnection factor requiring a disconnection between the first and the second communication devices;

transmitting means for transmitting the disconnection factor detected in the detecting means through the switched network to the first communication device, without affecting a user communication maintained through the switched network between the first and the second communication devices; and delaying means for delaying disconnection in response to the detected disconnection factor until transmission of the disconnection factor by the transmitting means is completed.

8. A communication device as claimed in claim 7, wherein the user communication uses a first frequency band, the transmitting means, further, transmiting the disconnection factor by using a second frequency band lower than the first frequency band.

* * * * *

UNITED STATES PATENT AND TRADEMARK OFFICE
CERTIFICATE OF CORRECTION

PATENT NO. : 5,285,198
DATED : February 8, 1994
INVENTOR(S) : ASAHINA

It is certified that error appears in the above-indentified patent and that said Letters Patent is hereby corrected as shown below:

Col. 5, line 24, delete "16,";
line 25, after "device" insert --16--.

Signed and Sealed this

Eleventh Day of October, 1994

Attest:

BRUCE LEHMAN

Attesting Officer      Commissioner of Patents and Trademarks